US010278365B2

(12) United States Patent
Nir et al.

(10) Patent No.: US 10,278,365 B2
(45) Date of Patent: May 7, 2019

(54) APPARATUS AND METHOD FOR DOG TRAINING

(71) Applicant: BIOCUBE DIAGNOSTICS LTD., Hod Hasharon (IL)

(72) Inventors: Golan Nir, Hod Hashason (IL); Tamir Goren, Modi'in (IL)

(73) Assignee: Biocube Diagnostics Ltd., Hod Hasharon (IL)

( * ) Notice: Subject to any disclaimer, the term of this patent is extended or adjusted under 35 U.S.C. 154(b) by 141 days.

(21) Appl. No.: 14/437,225

(22) PCT Filed: Oct. 23, 2013

(86) PCT No.: PCT/IL2013/050859
§ 371 (c)(1),
(2) Date: Apr. 21, 2015

(87) PCT Pub. No.: WO2014/064693
PCT Pub. Date: May 1, 2014

(65) Prior Publication Data
US 2015/0264892 A1    Sep. 24, 2015

(30) Foreign Application Priority Data

Oct. 25, 2012 (IL) .......................... 222696

(51) Int. Cl.
A01K 15/00 (2006.01)
A01K 15/02 (2006.01)
(Continued)

(52) U.S. Cl.
CPC ............ A01K 15/02 (2013.01); A01K 27/003 (2013.01); A01K 29/005 (2013.01)

(58) Field of Classification Search
CPC .......... A01K 1/03; A01K 1/031; A01K 1/033; A01K 1/034; A01K 1/035; A01K 15/00;
(Continued)

(56) References Cited

U.S. PATENT DOCUMENTS 2,346,001 A * 4/1944 Bate .................. A01K 1/03
119/472
3,830,201 A * 8/1974 Coulbourn ............ A01K 1/031
119/417
(Continued)

FOREIGN PATENT DOCUMENTS

CN    202456059 U    10/2012
FR    2956211 A1    8/2011

OTHER PUBLICATIONS

"How big should dog kennel be" (Year: 2011).*
(Continued)

Primary Examiner — Thanh Pham
(74) Attorney, Agent, or Firm — Roach Brown McCarthy & Gruber, P.C.; Kevin D. McCarthy

(57) ABSTRACT

Apparatus for training a subject dog to perform target odor detecting operations within a completely confined compartment, which comprises a partial compartment having at least three angularly different surfaces to define an interior. The surfaces are sufficiently long to provide a subject dog located within the interior with a sensation of being at least partially confined. An air inlet is defined by a configuration of the partial compartment, by which odor laden air is introducible into the interior and is detectable by the nose of the subject dog. A dog interfaceable member is operatively connected to the partial compartment and activatable upon detection of a predetermined target odor.

26 Claims, 14 Drawing Sheets

(51) Int. Cl.
*A01K 27/00* (2006.01)
*A01K 29/00* (2006.01)

(58) Field of Classification Search
CPC ...... A01K 15/02; A01K 15/027; A01K 29/00; A01K 29/005; G01N 1/2214; G01N 1/24; G01N 33/004; G01N 33/0057; G09B 19/00
See application file for complete search history.

(56) References Cited

U.S. PATENT DOCUMENTS

| | | | | |
|---|---|---|---|---|
| 4,334,501 A * | 6/1982 | McDaniel | ............... | A01K 1/033 119/475 |
| 4,896,547 A * | 1/1990 | Arney | ................. | G01N 1/2273 73/863.81 |
| 5,186,677 A * | 2/1993 | Christensen | ............. | A22B 1/00 452/53 |
| 5,383,422 A * | 1/1995 | Morris | ................... | A01K 1/033 119/168 |
| 5,577,464 A * | 11/1996 | Wellington | .......... | A01K 63/003 119/452 |
| 6,018,984 A * | 2/2000 | McGinley | ............ | G01N 1/2273 422/83 |
| 6,273,027 B1 | 8/2001 | Watson | | |
| 6,763,784 B1 * | 7/2004 | Liu | ........................ | A01K 31/06 119/452 |
| 6,790,249 B2 * | 9/2004 | Davies | ..................... | B08B 5/02 454/187 |
| 7,023,339 B2 * | 4/2006 | Stomski | .................... | E04H 9/06 109/26 |
| 7,198,008 B2 | 4/2007 | Poyner | | |
| 7,717,066 B2 | 5/2010 | Drolet | | |
| 7,921,810 B2 | 4/2011 | Lumbroso et al. | | |
| 2001/0054394 A1 * | 12/2001 | Marchioro | .......... | A01K 1/0245 119/452 |
| 2002/0124809 A1 * | 9/2002 | Verburg | ............... | A01K 1/0082 119/516 |
| 2005/0224003 A1 * | 10/2005 | Yin | ...................... | A01K 5/0275 119/61.5 |
| 2006/0174843 A1 * | 8/2006 | Poyner | ................. | A01K 15/027 119/712 |
| 2006/0260972 A1 * | 11/2006 | Ayres | ................... | A01K 1/0245 206/512 |
| 2007/0006814 A1 * | 1/2007 | Mead | ..................... | A01K 1/031 119/420 |
| 2007/0186868 A1 * | 8/2007 | Dietrich | ................... | A22B 3/00 119/678 |
| 2008/0163671 A1 * | 7/2008 | Dugan | ............... | G01N 33/0073 73/23.34 |
| 2009/0038332 A1 * | 2/2009 | Heimbach | ............ | A01K 1/0082 62/419 |
| 2009/0038555 A1 | 2/2009 | Reese | | |
| 2009/0145369 A1 | 6/2009 | Lumbroso | | |
| 2010/0050958 A1 * | 3/2010 | Jackson | ............... | A01K 13/008 119/850 |
| 2010/0095896 A1 * | 4/2010 | Van Wye | ............... | A01K 15/02 119/57.92 |
| 2010/0300371 A1 * | 12/2010 | Oeltjen | .................. | A01K 1/034 119/474 |
| 2010/0313815 A1 * | 12/2010 | Maeda | .................... | A01K 7/027 119/61.52 |
| 2011/0036302 A1 * | 2/2011 | Oedekoven | .............. | A01K 1/00 119/500 |
| 2011/0053129 A1 * | 3/2011 | Basson | .................. | G09B 19/00 434/238 |
| 2012/0077159 A1 | 3/2012 | Araujo | | |
| 2012/0103060 A1 | 5/2012 | Brasfield | | |
| 2012/0210947 A1 * | 8/2012 | DiPaolo | ................. | A01K 15/02 119/472 |
| 2012/0234256 A1 * | 9/2012 | Harte | ..................... | A01K 1/031 119/421 |
| 2014/0083364 A1 * | 3/2014 | Anderson | ................ | A01K 5/01 119/51.01 |
| 2015/0334990 A1 * | 11/2015 | Nir | ......................... | A01K 15/02 600/301 |

OTHER PUBLICATIONS

International Preliminary Report on Patentability for a counterpart foreign application—17 pages, dated Dec. 14, 2014.
International Search Report for a counterpart foreign application—5 pages, dated Jan. 30, 2014.
Communication and Supplementary European Search Report for a counterpart foreign application—EP 13 84 9827—dated May 25, 2016; 5 pages.

* cited by examiner

APPARATUS AND METHOD FOR DOG TRAINING

FIELD OF THE INVENTION

The present invention relates to the field of detecting target materials. More particularly, the invention relates to an apparatus and method for training a dog to detect odors emitted from target materials, such as dangerous materials or illegal materials and from subject's (human or animal) body.

BACKGROUND OF THE INVENTION

Many custom enforcement personnel employ dogs to detect dangerous or illegal materials, chemical materials and biological materials by the odors emitted thereby. Also, odors emitted from the body of a living subject (human or animal) may provide indications about the physiological or mental state of a subject, such as early stages of cancer, an incubation stage of an epidemic etc. Therefore, fast and reliable detection of such emitted odors is highly desirable.

Trained dogs are generally among the most reliable means for detecting such materials, being able to detect target odors at extremely low concentrations in the order of 1 part per million or less. Trained dogs have been used in field for detecting explosive materials, more than any other methods, since the nose of a dog is the most advanced sensor provided by evolution, much more advanced than any other technology. Actually, there is no such accurate, fast, sensitive, mobile and durable technology that can meet the capabilities of a trained dog. Some canine based detection systems are disclosed for example in U.S. Pat. No. 7,717,066, US 2009/0038555, and FR 2956211.

However, prior art canine based detection systems suffer from several disadvantages. Firstly, the handler must have high skills in order to accurately identify and interpret the dog's behavior, as well as changes in its behavior.

Generally, it is hard for a dog to detect a target odor alone and it needs to operate in conjunction with a handler. The quality of odor detection of a trained dog is determined by the skills of its handler.

Secondly, the screening process preceding a detection event is relatively long and monotonic to the handler and it is hard for him to maintain a high level of motivation and awareness for long periods. As a result, when the dog feels that the motivation of his handler has been deteriorated, it will not perform his part appropriately.

Thirdly, using conventional detection methods and devices cause the capability of a dog to operate efficiently to be limited to continuous periods of up to 20 minutes in good weather conditions and even less in worse weather conditions. Generally, the average total net operation period of a dog is limited ranges between 60-180 minutes for each 24-hour period. Therefore, the output obtained from a trained dog is relatively low, due to its level of fatigue and whether conditions. The aforementioned disadvantages of the prior art canine based detection systems may be obviated when the dog performs an odor detection operation within a compartment which is partially of fully isolated from its handler and target material. It should be mentioned that dogs have natural tendency to freedom and natural hesitation from confined compartments and places. Forcing an untrained dog to enter such a confined compartment will cause it to try getting out from the compartment to be free, while trying to bite and scratch the walls of the compartment.

U.S. Pat. No. 7,921,810 discloses a method for detecting a target substance by training an animal to execute a particular avoidance action upon detecting a target substance in order to avoid an aversive stimulus such as an electric shock, a loud noise, and a bright light. In an operational phase, the trained animal is exposed to air flowing through a container containing a specimen odor to be examined. Sensors produce a useful output signal when the trained animal performs the avoidance action. The animal is housed within a cage that includes the basic living necessities for the animal during the training phase and the operational phase.

By being subjected to an aversive stimulus, the trained animals are caused to be under constant psychological stress due to the concern that they will again be subjected to an irritating negative reinforcement. As a result of the psychological stress to which the animal is subjected, it may refuse to enter a confined compartment and to accurately perform long-duration detection of target odors.

It is an object of the present invention to provide an apparatus and method for training a dog to willingly enter a confined compartment and to consequently perform accurate and long-duration odor detection operations, while keeping the energy and high performance of the dog for longer time periods.

Other objects and advantages of the invention will become apparent as the description proceeds.

SUMMARY OF THE INVENTION

The present invention is directed to an apparatus for training a subject dog to perform target odor detecting operations within a completely confined compartment, which comprises:

a) a partial compartment having at least three angularly different surfaces to define an interior, the surfaces being sufficiently long to provide a subject dog located within the interior with a sensation of being at least partially confined;

b) an air inlet defined by a configuration of the partial compartment, by which odor laden air is introducible into the interior and is detectable by the nose of the subject dog; and c) at least one dog interfaceable member which is operatively connected to the partial compartment and activatable upon detection of a predetermined target odor.

The apparatus may further comprise a device for sequentially displacing to the vicinity of the air inlet a plurality of odor emitting objects, at least two of the objects emitting different odors to thereby train the subject dog to discriminate between positive odors and negative odors that are detectable by a time delay. This device may be a carousel comprising a plurality of arms connected together at a central section which is rotatably mounted onto a vertically oriented rod, to an end of each of the arms is attached a receptacle containing a corresponding odor emitting object.

The apparatus may further comprise a food dischargeable member extending downwardly into the interior of the partial compartment and a basin for receiving a dominant encouragement discharged from the member without any visible human intervention.

The apparatus may further comprise one or more illumination elements or sound emitting elements for providing the subject dog with a secondary encouragement as an indication that it performed up to expectations while detecting the target odor and that the dominant encouragement will be soon discharged.

The dog interfaceable member may be a pushbutton movably connected to a wall of the partial compartment, receipt of the dominant encouragement constituting an incentive for accurately depressing the pushbutton. Alternatively, the dog interfaceable member is a carrier for a sensor for determining electrical activity in the brain of the subject dog, a predetermined wave pattern being indicative of a canine mental state of satisfaction when the predetermined target odor has been detected.

The partial compartment may be modular and one or more segments are attachable thereto in order to increase the size of the interior of the partial compartment and to correspondingly increase a degree of acclamation of the subject dog to confinement.

The three or more surfaces of the partial compartment may be dimensioned such that the subject dog will be able to freely perform normal canine motions within the completely confined compartment after being fully assembled.

The rear portion of the partial compartment may be open.

The bottom portion of the partial compartment may be closed and a top portion thereof is open.

The air inlet may be an aperture formed in a front wall of the partial compartment.

The front wall may comprise an openwork segment that has been attached to, and above, a front surface of an original partial compartment in which the air inlet is formed.

The apparatus may further comprise a ventilator positioned proximate to the air inlet which, when activated, will cause odors to flow into the air inlet and be able to be detected by the subject dog.

The apparatus may further comprise a rod for attaching an odor emittable package to the front wall.

The ventilator may be a blower that is positioned within a hose that is attached to the front wall so as to be in communication with the air inlet.

The free end of the hose may be positionable proximate to the device for sequentially displacing the plurality of odor emitting objects.

The apparatus may further comprise one or more video cameras for monitoring behavior of the subject dog when the subject dog ceases to have a line of sight with its handler.

The completely confined compartment has one or more wall members that are slidable to reveal a chamber through which a handler is able to interact with the subject dog.

The completely confined compartment may have a grille from which air is dischargeable from the interior.

The present invention is also directed to a method for training a dog to perform odor detecting operations within a completely confined compartment using the apparatus of claim 5, comprising the steps of
  a) leashing the subject dog to one of the at least three surfaces of the partial compartment;
  b) introducing into the interior of the partial compartment, via the air inlet, odor laden air originating from a first odor source;
  c) introducing into the interior of the partial compartment, via the air inlet, odor laden air originating from a second odor source emitting the predetermined target odor;
  d) viewing the subject dog during an odor detection operation to determine whether the subject dog performs a trained action to indicate that an odor has been detected;
  e) refraining from any reaction to the subject dog after it incorrectly performed the trained action following introduction of the odor laden air originating from the first odor source; and
  f) providing the dominant or secondary encouragement only after the subject dog performed the trained action following introduction of the odor laden air originating from the second odor source.

The dominant encouragement may be provided to the subject dog within a predetermined duration following provision of the secondary encouragement.

The predetermined duration may be increased when the subject dog is at a more advanced stage of training and may be selected from the group consisting of 5 seconds, 1 minute, and 10 minutes.

The method may further comprise the step of sequentially displacing to the vicinity of the air inlet a plurality of odor emitting objects, at least two of the objects emitting different odors, to thereby train the subject dog to discriminate between positive odors and negative odors and to wait patiently within the partial compartment until a positive odor is detected.

The partial compartment may be modular and one or more segments are attached thereto in order to increase the size of the interior of the partial compartment and to correspondingly increase a degree of acclamation of the subject dog to confinement after the subject dog has been unleashed.

An openwork segment may be attached to, and above, a front surface of an original partial compartment and the air inlet is formed in the front surface, the subject dog being trained to position its nose within the air inlet during an odor detecting operation even though an object associated with the second odor source is visible through the openwork segment.

The subject dog may be trained, prior to being capable of performing an odor detecting operation within the partial compartment, to be willing to remain in, or to enter, a confined compartment by being rewarded with the dominant or secondary encouragement only within the interior of the confined compartment and thereby associating pleasant memories with the confined compartment.

The handler may train the subject dog, before the subject dog is capable of performing an odor detecting operation within the partial compartment, to identify the target odor by introducing the target odor into an odor emittable package, and rewarding the subject dog with the dominant encouragement every time that it places its nose on the package containing the target odor.

The subject dog may be also trained, prior to being capable of performing an odor detecting operation within the partial compartment, to discriminate between positive and neutral odors and is then trained to discriminate between positive and negative odors.

The subject dog may be trained to perform the action by:
  a) detecting the target odor;
  b) being granted the secondary encouragement;
  c) being forced by a handler to perform the action immediately after being granted the secondary encouragement;
  d) receiving the dominant encouragement; and
  e) eventually instinctively performing the action after detecting the target odor.

The trained action may be selected from the group consisting of depressing a button, sitting, lying down, rolling over, and barking.

The dog interfaceable member may be provided with a sensor for determining electrical activity in the brain by means of an electroencephalogram (EEG), to provide a predetermined wave pattern being indicative that the predetermined target odor has been detected.

DETAILED DESCRIPTION OF PREFERRED EMBODIMENTS

Figure 1:
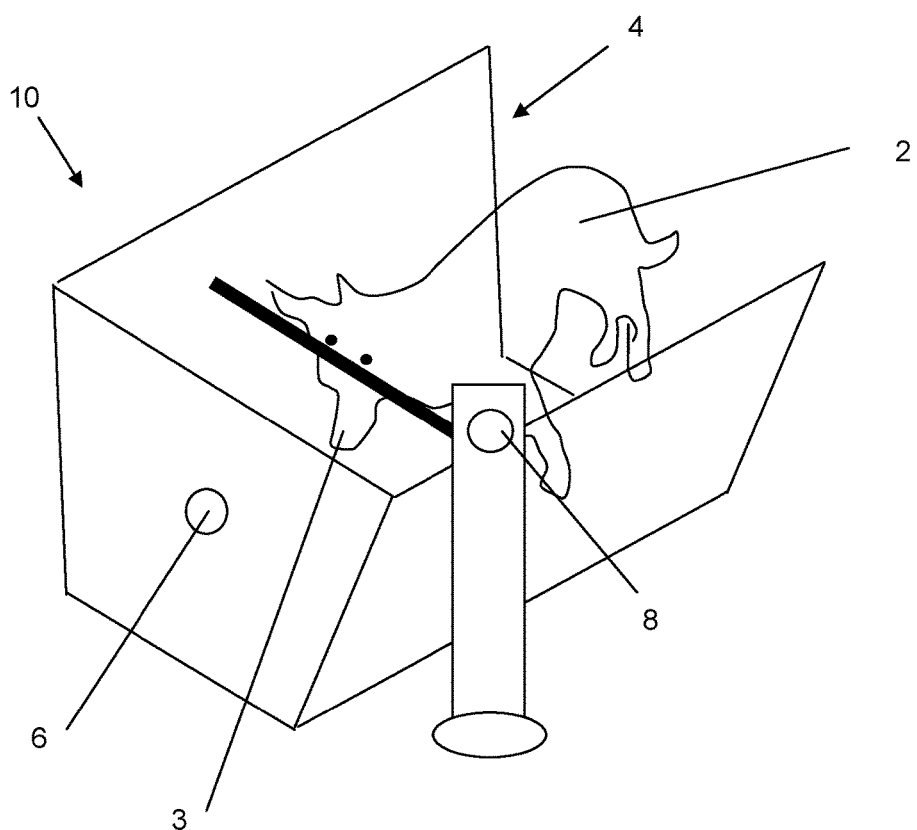
FIG. 1 is a schematic illustration of dog training apparatus, according to one embodiment of the present invention.

It has now been discovered that the effectiveness of a trained dog in terms of accuracy and longevity of an odor detection operation, being defined as the duration from the beginning to end of a shift during which the dog detects a large number of target odors from many different sources, is dramatically increased when the dog performs the odor detection operation continuously within a confined compartment.

During prior art odor detection methods whereby the dog walks or runs back and forth between different stations in order to detect a target odor, the dog suffers from a significant loss of energy as a result of its physical activity. The dog consequently becomes tired and pants, causing moisture on the tongue to evaporate and to cool the tongue so that the blood flow through the tongue and the respiratory system will also become cooled. When a dog pants, however, the dog is forced to open its mouth and a reduced amount of air flows over its nose, results in a less effective odor detection operation. The tiredness of a dog becomes exacerbated during a hot day or when located in hot surroundings, such as within a closed car. Consequently, the duration of an odor detection operation for trained dogs is generally limited intervals of up to 20 minutes and up to a total time of up to 200 minutes during 24-hour period.

The effectiveness of a dog during a prior art odor detection operation is greatly dependent on the relation established with its handler, who is aware of the trained indication the dog makes after detecting a predetermined target odor and knows when the dog should be rewarded.

It should be indicated that each dog has a handler that is exclusively associated with it and knows it very well. As a result, if from some reason the handler cannot function (due to illness or injury), in most cases his associate dog will stop functioning and will not be willing to function with an alternative unknown handler. Any attempt to associate an alternative handler to the dog will lead to a situation where the alternative handler will not be able to identify unique signs that the dog provides. As a result both of them will be frustrated. Another disadvantage of conventional methods is the fact that during a screening process, it is not possible to work with several dogs, since dogs interact with each other. This interaction deflect the dogs' mind from their mission to detect the target material and causes energy waste to tem and to their handlers.

When the trained dog is located within a confined and sufficiently large, air conditioned compartment, it is able to conserve its energy. By virtue of the reduced physical activity within the confined compartment during a detection operation, the dog experiences less fatigue and an increased attention span, and is therefore able to work consecutively for time intervals of at least an hour each, and up to a total of 6-10 hours during 24-hour period (compared to 1-2 hours using conventional methods). Also, the dog is able to perform an odor detection operation while its mouth is continuously closed. Thus a maximum amount of air flows over its nose, allowing a more accurate detection to be made.

Israeli Patent Application No. 224126 by the same Applicant teaches that the confined compartment comprises a dog interfaceable member, such as a pushbutton, which may be distinctive to the dog. The dog depresses the pushbutton with its nose by a force within a predetermined range when it detects a predetermined target odor, generating a predetermined signal to indicate that the predetermined target odor has been detected.

The present invention involves an apparatus and method for training a dog to willingly enter a confined compartment and activate the dog interfaceable member when the predetermined target odor has been detected, enabling an accurate and long-duration odor detection operation to be performed. Without being properly trained, a dog forced to enter a confined compartment will be very irritable, moving repeatedly back and forth within its interior, will try to bite and scratch the walls of the compartment or run away from the compartment, and will be invariably uncooperative in performing any task, even if commanded by its handler.

FIG. 1 schematically illustrates dog training apparatus, generally indicated by numeral 10, according to one embodiment of the present invention.

Apparatus 10 comprises a partial compartment 4 into which a dog 2 being trained (hereinafter "subject dog") is trained to enter willingly. Partial compartment 4 is shown to have at least three angularly different surfaces as shown, e.g. a front side, lateral sides, but less than six sides which would define a completely closed rectilinear compartment, being open from the rear. The surfaces of partial compartment 4 may be made of any suitable material and configured by any desired shape or size.

The surfaces of partial compartment 4 are dimensioned to be sufficiently long to provide the subject dog with a sensation of being partially confined such that it will be willing to remain therein without being trained, yet the partial compartment is sufficiently open not to stimulate the dog's natural hesitation from confined spaces. In order to prevent the subject dog from leaving its interior (a natural action for a dog that enters a space which is partially or fully confined), the dog is fastened to the partial compartment by its collar. Partial compartment 4 may be modular in the sense that one or more segments may be attached thereto by any means well known to those skilled in the art, so that when the compartment is fully assembled its interior will be sufficiently large so that the subject dog will be completely enclosed therewithin and will be able to freely perform normal canine motions such as sitting, lying down, and bark, yet is sufficiently small to prevent the subject dog from running or roaming within the compartment, in order to conserve its energy. If so desired, partial compartment 4 may be open on top and closed on the bottom.

An air inlet 6 is formed in partial compartment 4, to allow odor laden air to be introduced into the interior of the partial compartment and to be accessed by the dog's nose 3. Air inlet 6 may be provided with a small clearance as shown, or may be considerably larger, for example being unenclosed by a side portion. Apparatus 10 also comprises dog interfaceable member 8, which provides an indication that a predetermined target odor has been detected. Dog interfaceable member 8 may be connected, e.g. movably connected, to a wall of partial compartment 4, or alternatively, may be detached therefrom.

Dog interfaceable member 8 may be a pushbutton which subject dog 2 is trained to activate upon detecting a predetermined target odor. Alternatively, dog interfaceable member 8 may be worn by the subject dog and be provided with a sensor for determining electrical activity in the brain by means of an electroencephalogram (EEG), so that a predetermined wave pattern will be indicative of the predetermined target odor has been detected. In addition, the dog may be trained to activate upon detecting a predetermined target odor a dog interfaceable member 8, which may be selected from a plurality of such members. This plurality may be a set of several pushbuttons, each of which corresponds to a different target odor. For example, if a dog is trained to detect an odor that corresponds to two types of cancer in a person, upon detecting a first type it will activate a specific pushbutton, and upon detecting a second type it will activate another pushbutton.

Figure 2:
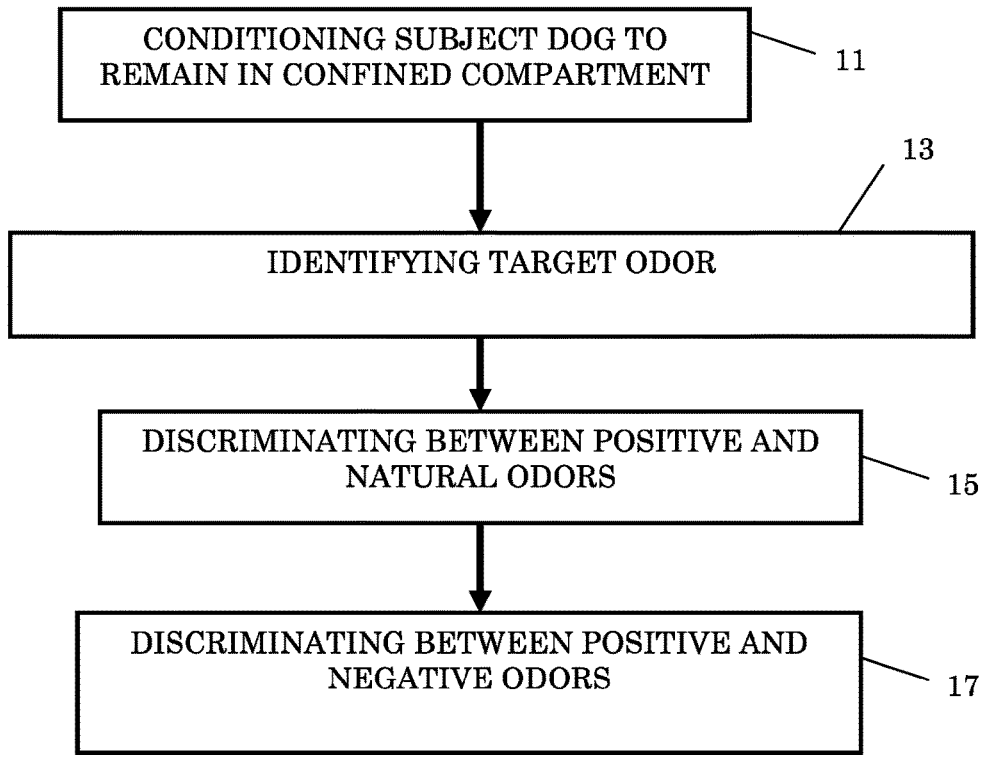
FIG. 2 is a method for training a subject dog to accurately perform an odor detection operation within a partial compartment, according to one embodiment of the present invention.

FIG. 2 illustrates a method for training a subject dog to accurately perform an odor detection operation within the partial compartment.

The subject dog is conditioned in step 11 to become accustomed to a completely confined compartment. At first, the subject dog is generally intimidated by the confined compartment, struggling to leave its interior as the nature of a dog is to be intolerant to, and stressed from, confined spaces. In order to counteract the natural intolerance to confined spaces, the subject dog is rewarded by being fed, patted or complemented only within the interior of the confined compartment. At the first stage, a stipulation for causing the dog to be willing to remain in the compartment, is generated such that the dog gets all the positive rewards inside the compartment favorite articles like bones and balls within the compartment. The subject dog therefore associates pleasant memories with the confined compartment, being a favorite place for receiving positive reinforcements, such as salami and bones or enjoyable games. After a while, the subject dog will voluntarily enter the confined compartment and will therefore be able to perform one or more trained detection related activities.

While the subject dog is becoming accustomed to a confined compartment, or even after the subject dog has become sufficiently accustomed to a confined compartment according to the judgment of its handler, the handler, with whom the subject dog has previously established a close rapport, trains the subject dog to identify a predetermined target odor in step 13 outside of the partial compartment. Exemplary target odors include, but are not limited to, those emitted by narcotics, explosives, human body of sick persons and persons who have cancer, forged money and more. A selected target odor is inserted within an odor emittable package such as a container or an envelope and is then brought close to the subject dog. The subject dog is immediately rewarded by a secondary encouragement, such as a pleasant sound (whistle), a pleasant visual indication (light) followed by an instant dominant encouragement (salami, bone, game etc.) that increases the dog's physical pleasure dominant. The secondary encouragements increase the dog's motivation during an odor detection operation, encouraging the subject dog to accurately perform the odor detection operation in order to benefit from the dominant encouragement and constituting an incentive for accurately performing future detection operations. Thus after several minutes, the subject dog learns to perform two actions: (a) placing its nose on the package containing the target odor, and (b) identifying a target odor while being able to screen out accompanying odors associated with the package, e.g. metal, plastic and paper. The identified target odor will therefore remain in the subject dog's memory, being one item in a bank of remembered odors.

In step 15, the subject dog learns to discriminate between a positive odor and a neutral odor. Two odor emittable packages are placed in front of the subject dog, wherein a first package is provided with the target odor that the subject dog has already learned to identify, i.e. the positive odor, and a second package lacks any recognizable odor, i.e. the neutral odor. The subject dog receives the dominant encouragement when the first package is selected.

The subject dog then learns in step 17 to discriminate between positive odors and negative odors. A "negative odor" is an odor that the subject dog has not learned to identify. Thus the subject dog will be also able to discriminate between positive odors and negative odors within the partial compartment.

Figure 3:
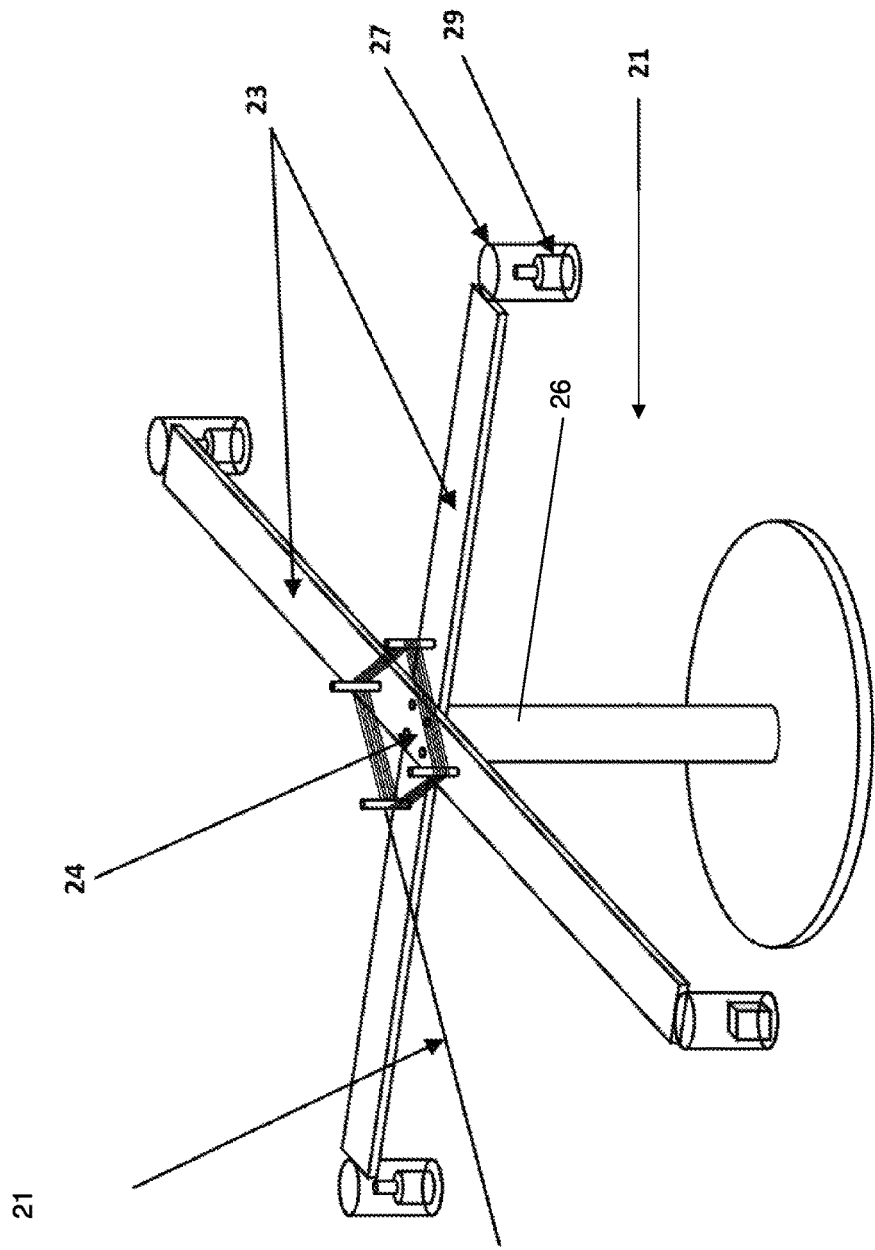
FIG. 3 is a perspective view of a carousel used to train a subject dog to discriminate between positive odors and negative odors.

As shown in FIG. 3, the subject dog may learn to discriminate between positive odors and negative odors by means of a carousel 21, or any other suitable displacement means. Carousel 21 comprises four equally sized arms 23, e.g. rectangularly shaped, connected together at a central section 24 which is rotatably mounted onto a vertically oriented rod 26, allowing the four arms 23 to revolve about rod 26. Attached to the end of each arm 23 is a cup 27, or any other receptacle, in which is placed an odor emitting object 29. Three objects 29 emit a negative odor, whether having a dominant odor intensity such as meat or perfume or a weak odor intensity such as leaves or soil, and one emits a positive odor.

The handler may walk the subject dog around carousel 21, encouraging it to identify the positive odor. Alternatively, the subject dog may remain in place while carousel 21 is rotated so that each of the plurality of arms is sequentially brought close to the subject dog's nose.

At first, the handler stimulates the subject dog's attention by generating stimulation on one of the receptacles 27, so that the subject dog will introduce its nose completely within the receptacle. After a while, the subject dog will instinctively introduce its nose into the receptacles 27. The subject dog is therefore trained by receiving a secondary encouragement, followed by a dominant encouragement to identify a positive odor, indicated for example when the subject dog ceases to walk around the carousel or introduces its nose into a receptacle, and to ignore the negative odors.

In addition to receiving a dominant encouragement, the subject dog may be trained by also receiving a secondary encouragement when a target odor is identified. The secondary encouragement may be a distinctive sound such as a high pitched sound produced by a whistle or a clicking sound, a visual encouragement such as pleasant light, or any other type of encouragement. The secondary encouragement provides indication to the subject dog that it performed up to expectations while detecting a target odor. After being provided with the secondary encouragement, the subject dog waits in anticipation for the dominant encouragement. Thus the handler may control the timing between receiving the secondary encouragement and dominant encouragement, or the response for which actions the dominant and secondary encouragements are granted, in order to improve the subject dog's performance.

Figure 4:
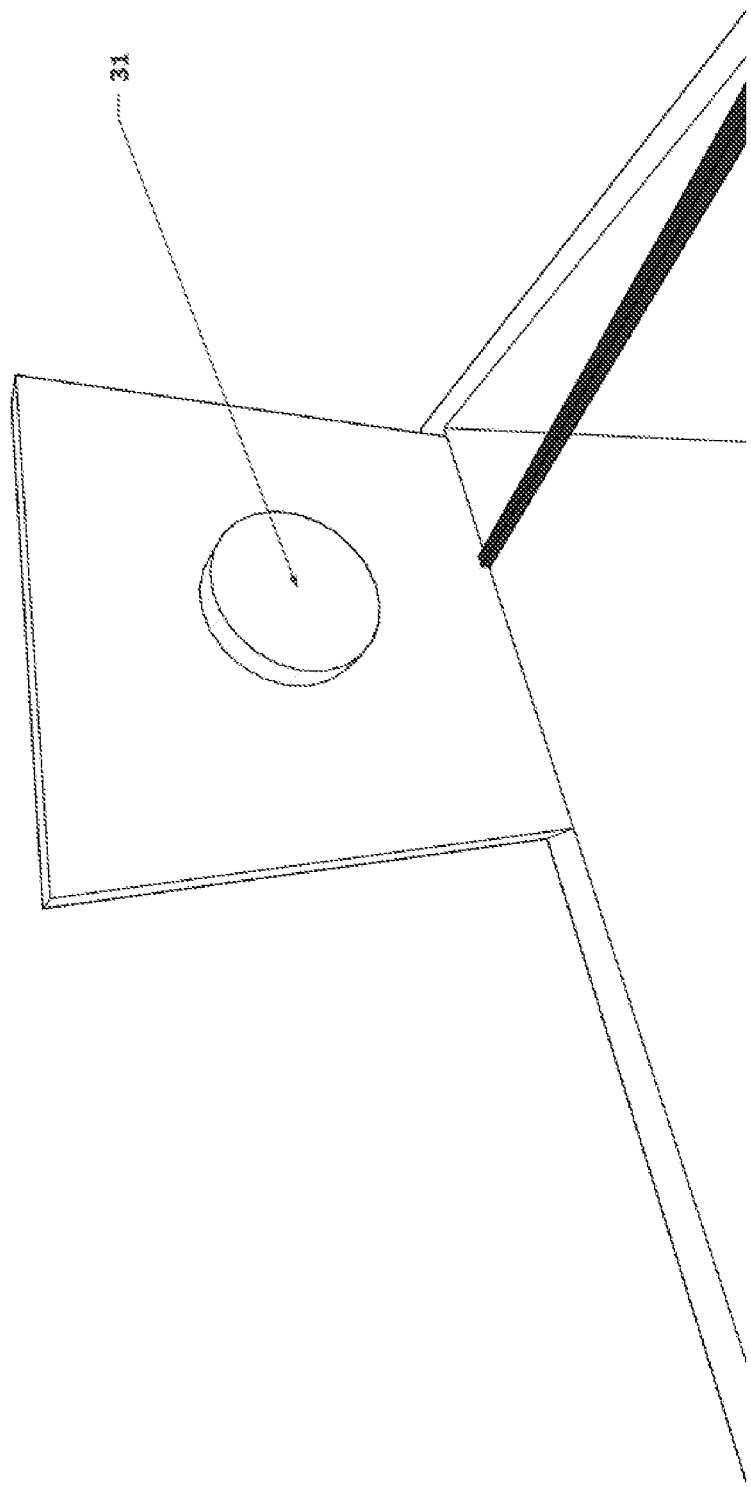
FIG. 4 is a perspective view of an exemplary depressible button used in conjunction with the apparatus of FIG. 1.

Accordingly, the subject dog may be trained to depress a pushbutton 31 shown in FIG. 4, or to perform any other desired trained action such as to sit or lie down, or bark upon detecting a predetermined target odor and receiving a dominant encouragement. The manner by which the trained action is performed may be indicative of the level of alertness of the subject dog.

Alternatively, the subject dog may be trained to become accustomed to wearing a carrier for an EEG sensor or any other dog interfaceable member by receiving a dominant encouragement according to the discretion of the handler.

Figure 5:
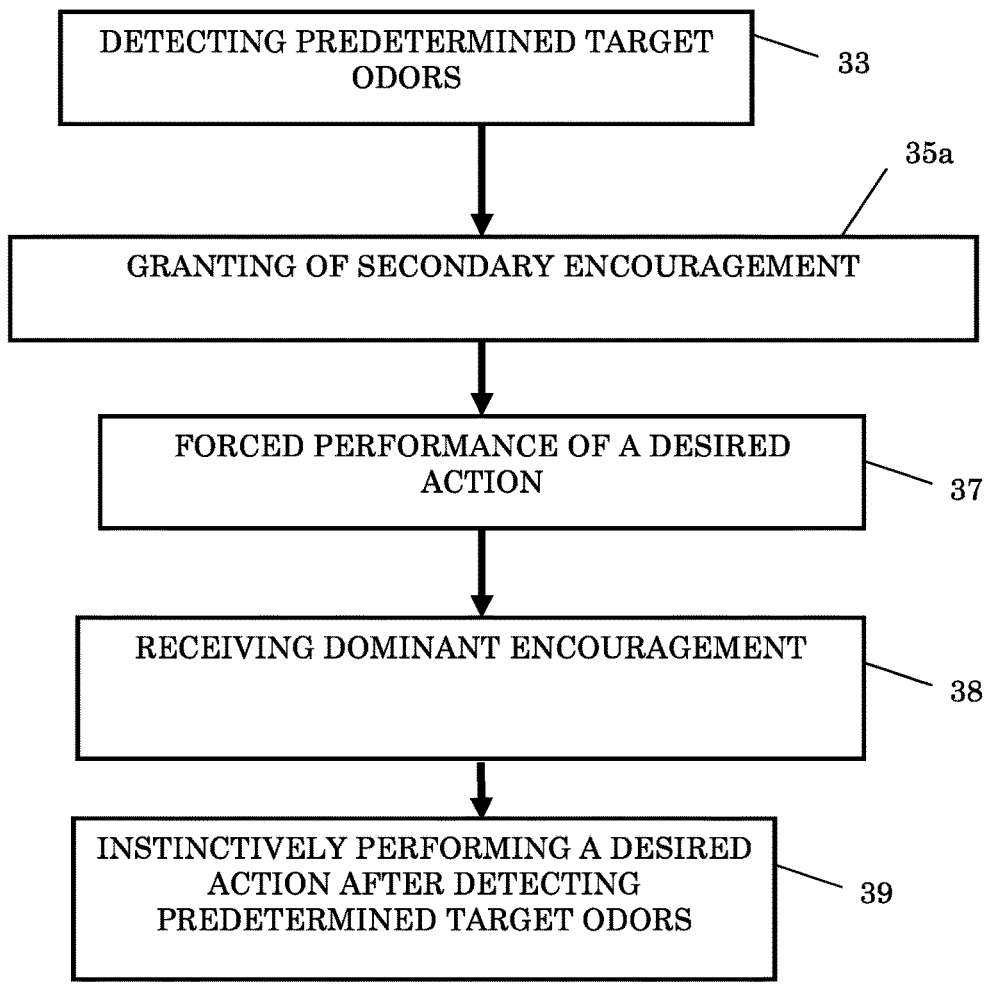
FIG. 5 is a method for training a subject dog to perform a desired action as an indication that it is accurately detecting a target odor.

With reference to FIG. 5, after the subject dog detects the predetermined target odor in step 33, such as by placing its nose on a package from which the target odor is emitted or by inserting its nose in a carousel receptacle containing an odor emitting object, the subject dog is granted a secondary encouragement in step 35a as a feedback that it performed correctly. The handler immediately forces the subject dog to perform the desired action in step 37, such as by generating a sound stimulation on the pushbutton 31, until its nose depresses the pushbutton, and then, to grant the secondary encouragement. The subject dog then receives the dominant encouragement in step 38 immediately after performing the desired action. Eventually the subject dog will instinctively perform the desired action in step 39 after detecting the predetermined target odor. The manner by which the desired action is performed provides indication to the handler that the subject dog is alert and is accurately performing odor detection operations.

Even though the subject dog is willing to perform enjoyable activities within the confined compartment, it will nevertheless be deterred from performing odor detection operations therewithin, including a predetermined trained action that is not enjoyable to the subject dog such as depressing a pushbutton, due to the natural aversion to being within a confined space.

Figure 6:
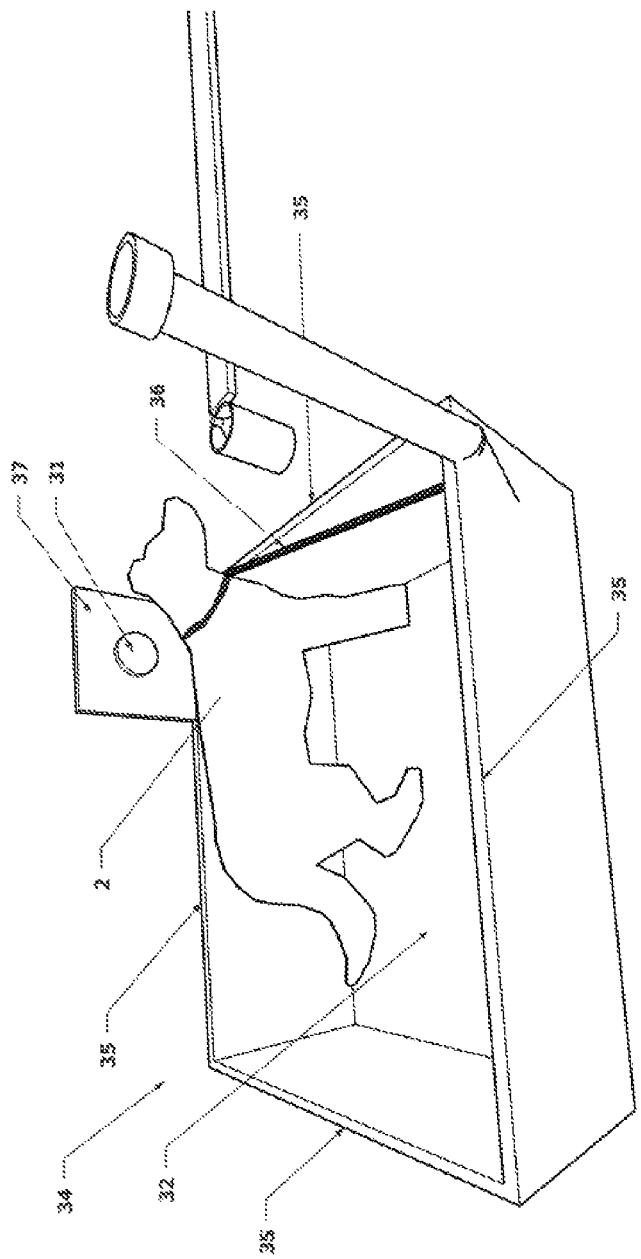
FIG. 6 is a perspective view of a partial compartment to which an additional segment has been attached.

At this stage, the subject dog starts to be trained to perform odor detection operations within the partial compartment. As illustrated in FIG. 6, subject dog 2 is brought into partial compartment 34, which is shown to be a bottom half of a completely confined compartment, e.g. the floor 32 is completely enclosed by sides 35 that vertically extend a height of 20-40 cm, but which may be configured in other ways as described hereinabove. Subject dog 2 is fastened to partial compartment 34 by means of leash 36 such that the subject dog will be unable to leave the partial compartment 34, yet its head can move freely and therefore perform an odor detection operation. At one end of partial compartment 34 is positioned a wall 37 which is considerably higher than sides 35 and to which is movably attached a depressible button 31.

Carousel 21 is positioned outside of partial compartment 34 so that, when its central section is rotated, each receptacle 27 containing an odor emitting object is made to be in olfactory accessibility to the subject dog. Subject dog 2 therefore learns to wait patiently within partial compartment 34 and to ignore negative odors. When the subject dog detects the target odor, it depresses button 31.

Figure 13:
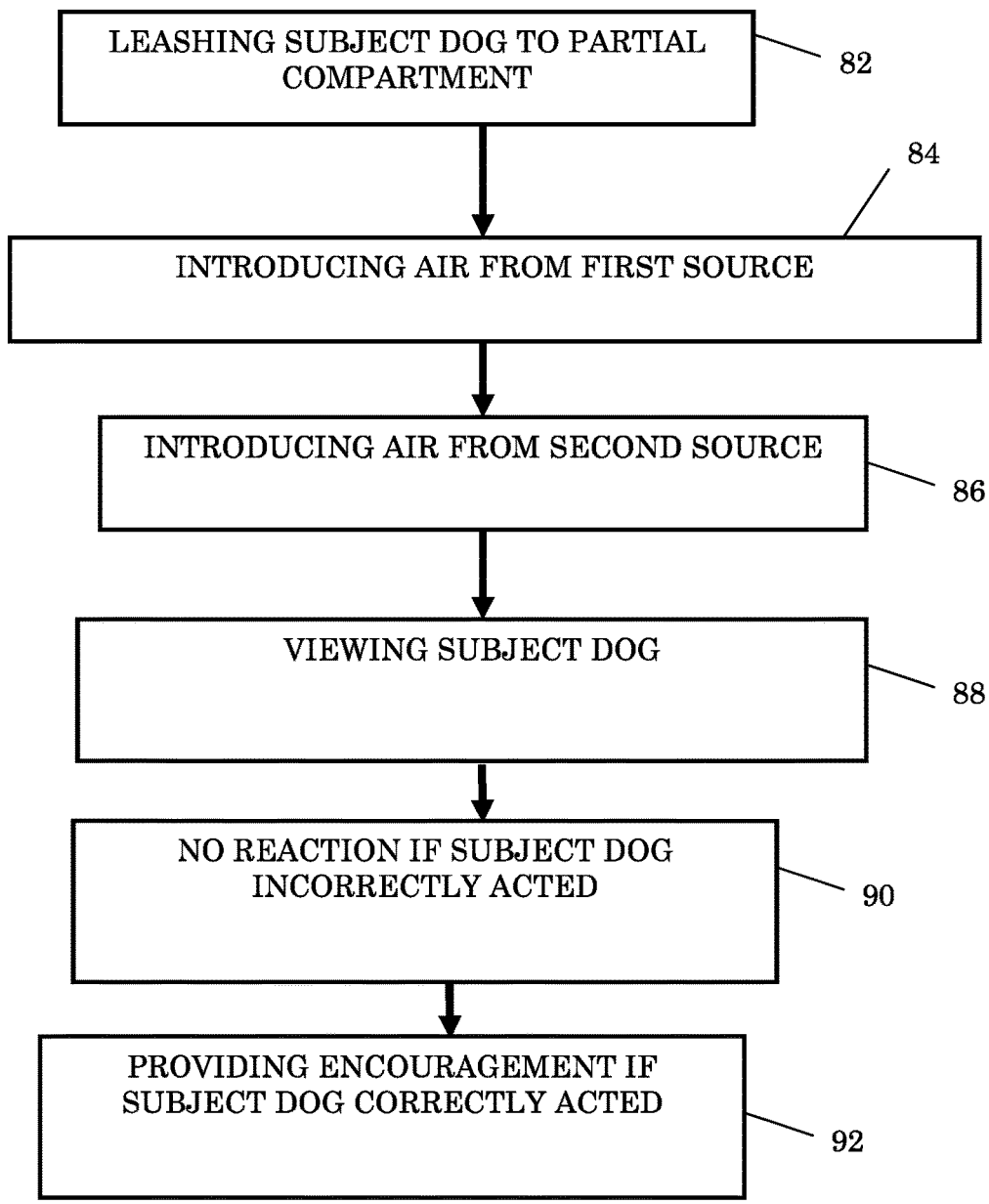
FIG. 13 illustrates operation of a subject dog, trained to perform an odor detection within partial compartment.

As shown in FIG. 13, the subject dog may be trained to perform an odor detection operation within the partial compartment. After the subject dog is leashed to the partial compartment in step 82, odor laden air originating from a first odor source is introduced into the interior of the partial compartment in step 84 and then odor laden air originating from a second odor source emitting the predetermined target odor is introduced in step 86. While the subject dog attempts to discriminate between the odors by the skills that it previously acquired, the handler views the subject dog in step 88 to determine whether it performed a trained action. In contrast to prior art dog training methods whereby a dog is reprimanded, electrificated or even spanked if it did not perform up to expectations, the handler in step 90 refrains from reacting to the subject dog if it incorrectly performed the trained action, i.e. following introduction of the odor laden air originating from the first odor source. The handler accordingly provides the dominant or secondary encouragement in step 92 only after the subject dog correctly performed the trained action, i.e. following introduction of the odor laden air originating from the second odor source. By receiving positive encouragements without any punishment, the subject dog has incentive to accurately perform odor detecting operations, even if they are of a relatively long duration or originate from a large number of sources, as occurs when the subject dog is to work in a completely confined compartment.

Figure 7:
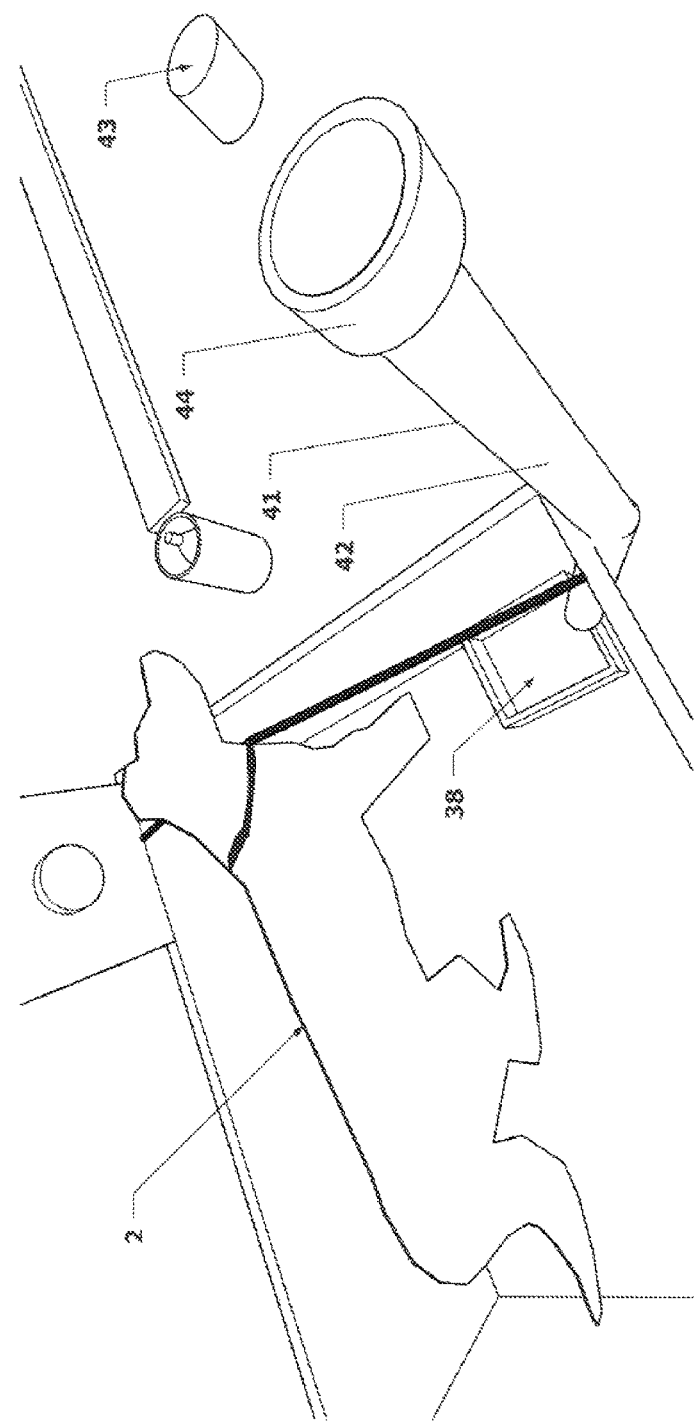
FIG. 7 is a perspective view of a food dischargeable member vertically extending from the partial compartment of FIG. 6.

A food dischargeable member 41 shown in FIG. 7, which may be configured in the form of a vertical pipe 42 and upper enlarged food introduction chamber 44 in communication with, and located above, pipe 42, may be positioned within the interior of partial compartment 34. The bottom of pipe 42 may be positioned above, e.g. 10 cm, floor 32 of partial compartment 34. A food basin 38 (FIG. 8) is also positioned within partial compartment 34, and is adapted to receive food, or any other dominant encouragement 43, delivered through member 41 Subject dog 2 will therefore receive its dominant encouragement directly within partial compartment 34 immediately after accurately detecting the target odor and performing the desired action, and will become accustomed to receive the dominant encouragement without observing human intervention in order to develop instinctive actions that will be performable during an odor detection operation.

It will be appreciated that the subject dog may be trained to detect the target odor and to receive the dominant encouragement by means of food dischargeable member 41 without use of a partial compartment, so as to train the dog to operate automatically and to understand that the dominant encouragement is granted by the confined compartment, rather than the handler. This way, the dog feels that it likes the confined compartment even more, while reducing the dominancy of the handler.

Figure 8:
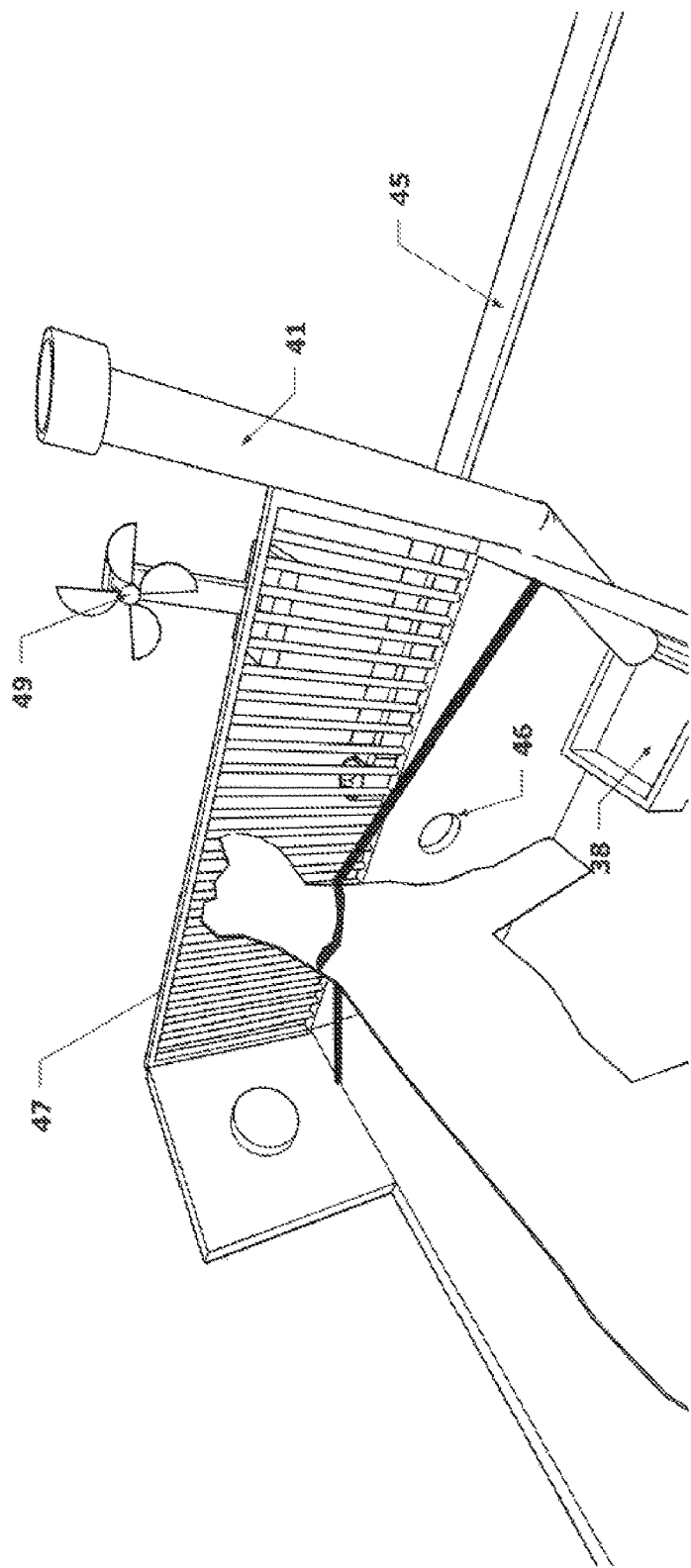
FIG. 8 is a perspective view of the partial compartment of FIG. 7, to which an openwork segment has been added.

In the training stage illustrated in FIG. 8, a front wall 47 having approximately the same height as wall 37 is added. Front wall 47 is preferably made of a dense or spacious metallic mesh, or any other suitable openwork configuration.

An air inlet 46 in the form of a large aperture is formed in the partial compartment side 35 below front wall 47. The size of air inlet 46 is customized to the dimensions of the subject dog, to allow its nose to be introduced within the air inlet and to detect target odors with its olfactory sense. An odor emittable package is attached to front wall 47 by means of a rod 45, in order to prevent human contact with the material that emits the odor. A fan 49, or any type of ventilator, is positioned proximate to air inlet 46, e.g. 1 m therefrom, so that when activated, will cause odors emitted by the package to flow into the air inlet and be able to be detected by the subject dog. The subject dog is trained to bend its head and position its nose within air inlet 46 to detect the target odor even though the package is visible through the openwork front wall 47 or even if the subject dog may jump over front wall 47 in order to access the package.

Figure 9A:
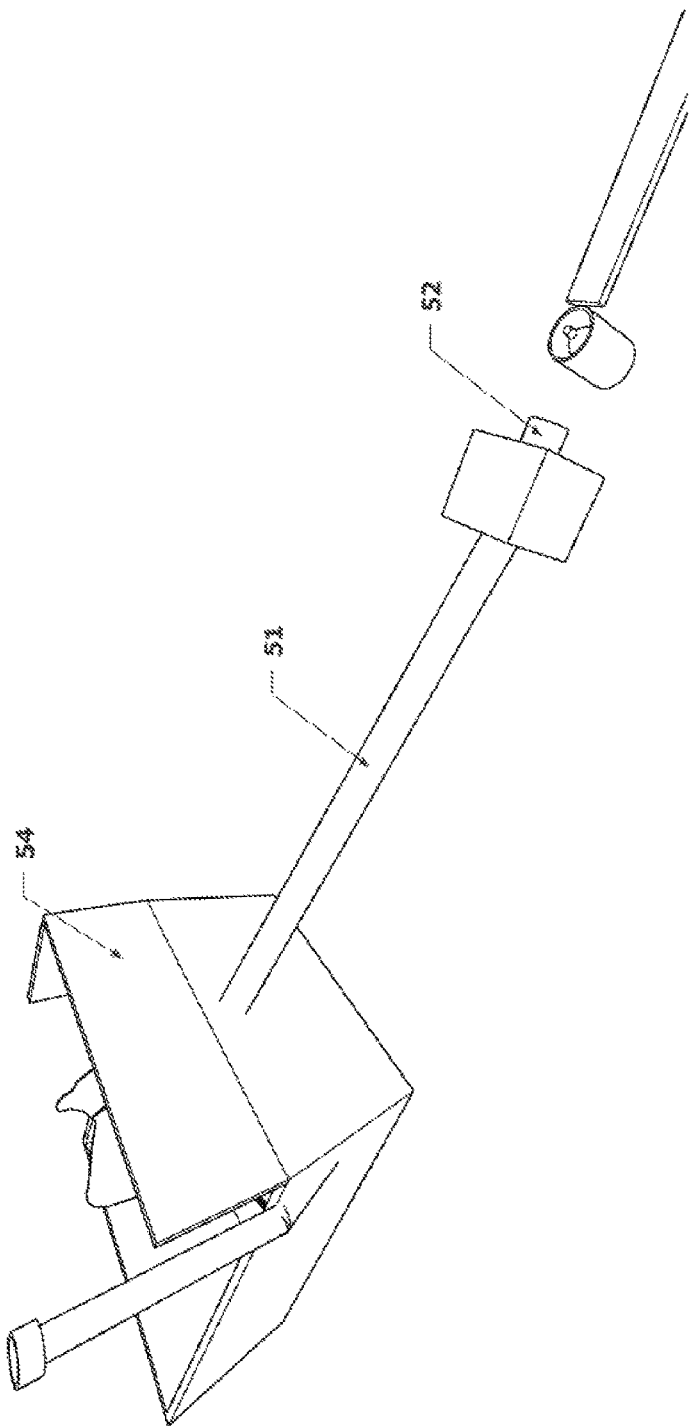
FIGS. 9a and 9b are perspective views of a hose through which odor laden air is transferred to the partial compartment of FIG. 8.

FIG. 9a illustrates a hose 51, e.g. having a length of 3 m, provided with an attached or integral blower that is then attached to partial compartment 34 so as to be in communication with the previously formed air inlet. A board 54 is attached to the front wall above hose 51. The free end 52 of hose 51 is placed in the vicinity of carousel 21 so that the various odors emitted by objects carried by the carousel will be fed into the hose and be detected by the subject dog.

Figure 9B:
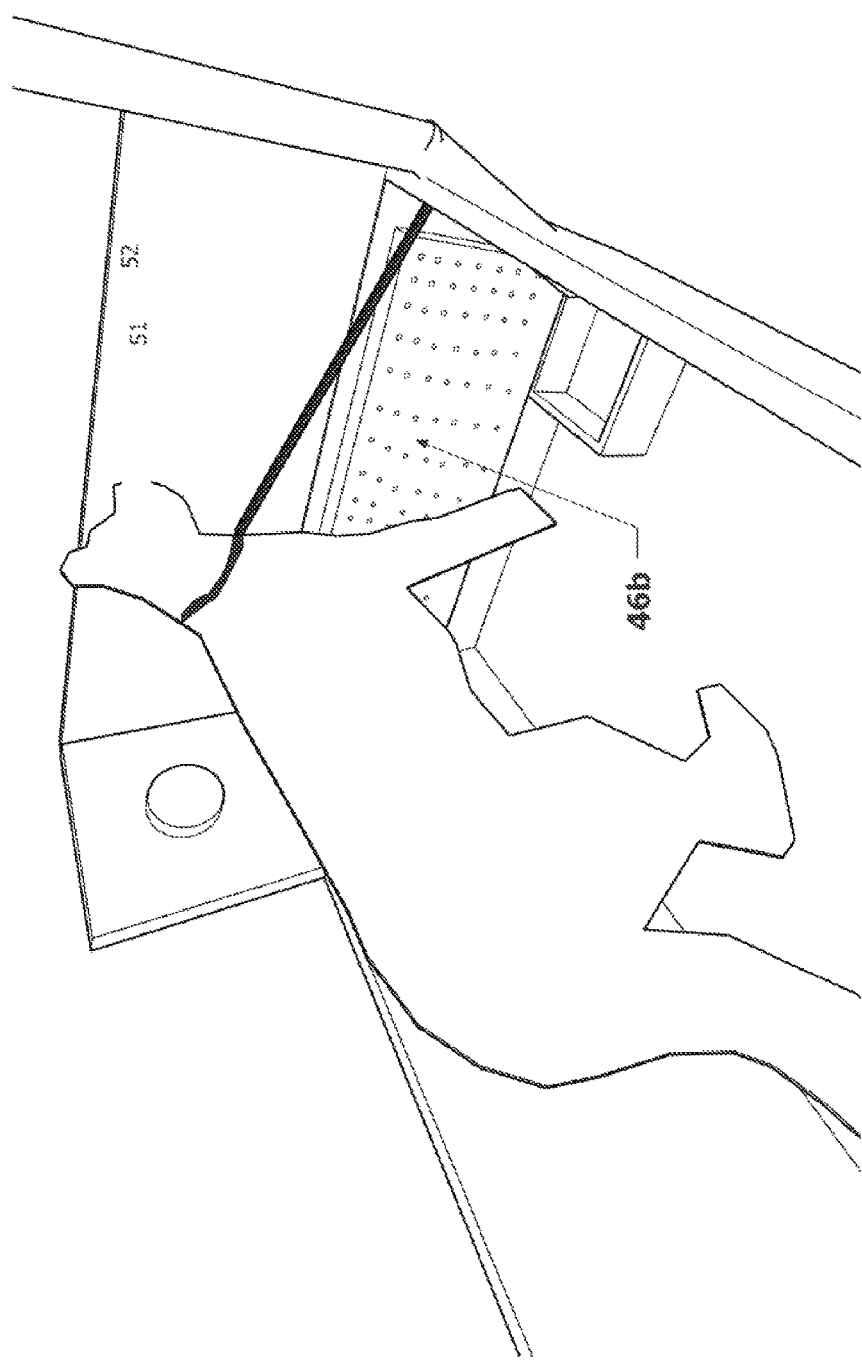

FIG. 9b shows a different method of implementing the air inlet 46, in the form of a device 46b that lets the air that flows from the hose into the interior to be spread in many direction from many sources, instead of one source. This implementation can make the dog subject sniffing activities more convenient for him.

Figure 10:
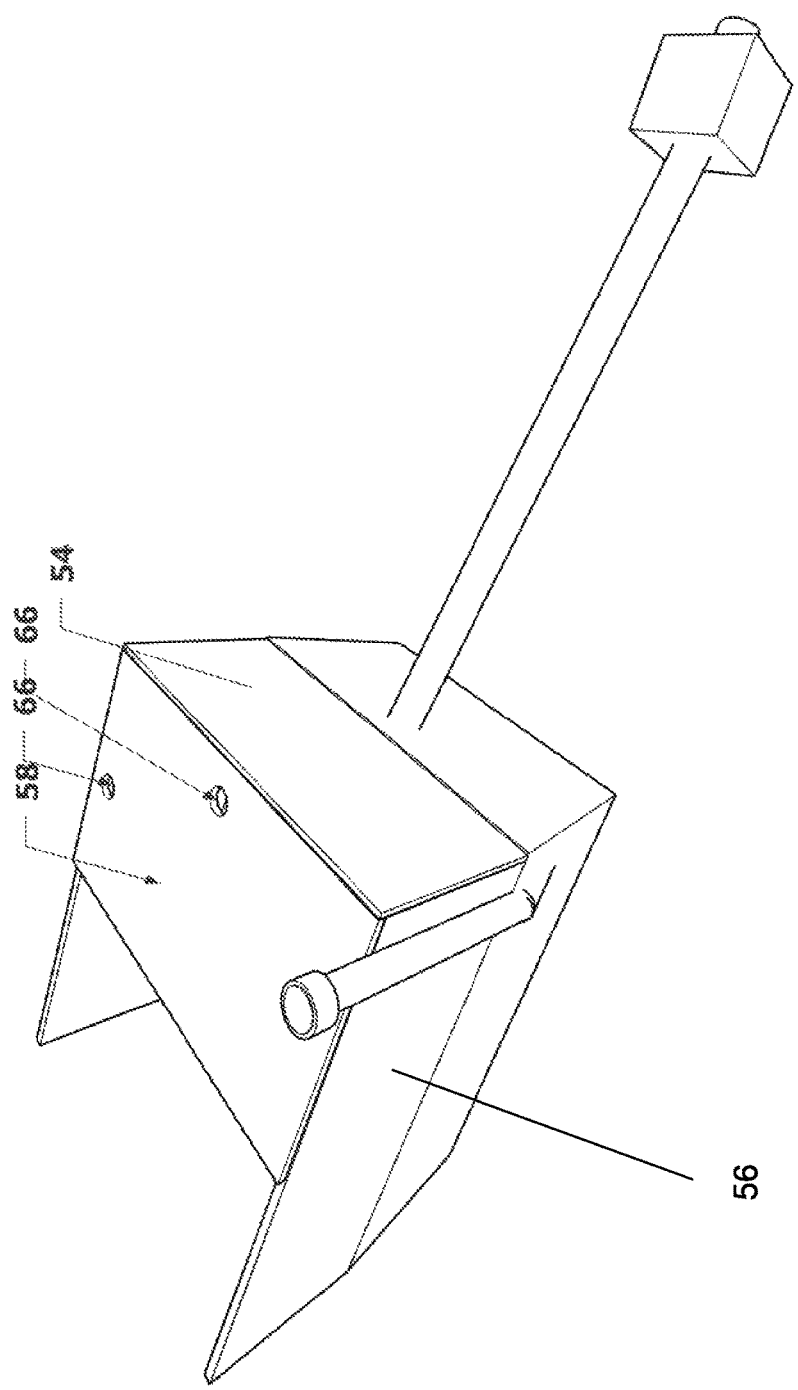
FIG. 10 is a perspective view from the top of a partial compartment, showing additional segments that have been attached thereto.

Additional enclosures are added to partial compartment 34 during the stage illustrated in FIG. 10. Rigid sides walls 56 are added, as well as top portion 58 such that the only unenclosed regions are at the rear of the partial compartment and at the top thereof. As this stage constitutes the first time that the subject dog ceases to be seen by its handler, video cameras 66 allow the handler to monitor the behavior of the subject dog, including the repeatability of inserting its nose into the air inlet prior to an odor detection operation, the reliability of depressing the pushbutton upon detecting a predetermined target odor, and its general alertness. Since the subject dog is unaccustomed to be confined in a compartment which is almost completely enclosed, the subject dog is allowed to remain therein at first for only a few minutes. After the subject dog is willing to be in the compartment, the working duration of the subject dog is gradually increased.

Figure 11:
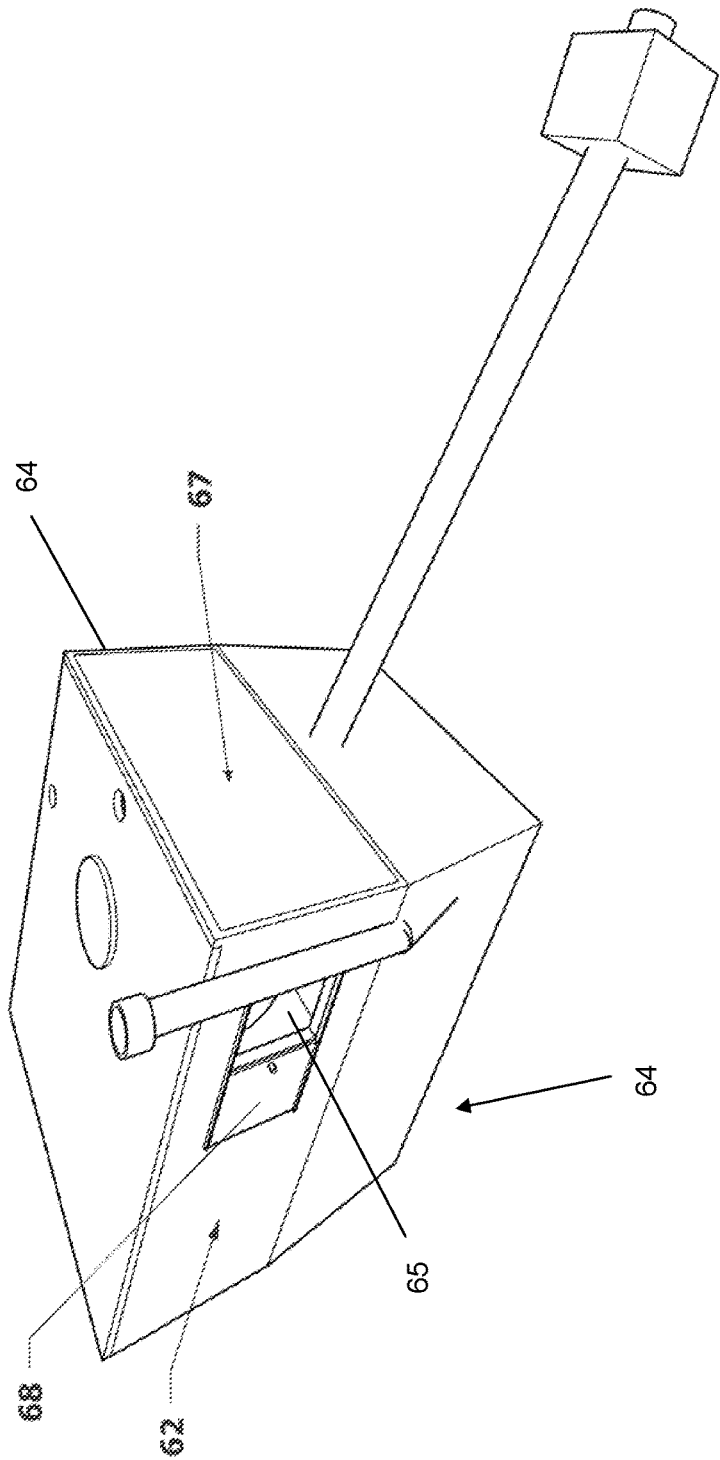
FIGS. 11 and 12 are two perspective views, respectively, of a completely confined compartment.

Eventually a completely confined compartment 64 which may be customized to the size of the subject dog is constructed, as shown in FIG. 11. Compartment 64 comprises a lower section in the form of partial compartment 34 to which the subject dog previously became accustomed and an upper section 62 in the form of a shell which is engageable with the lower section. Alternatively, compartment 64 may be a unitary member which is integrally formed with the upper and lower sections.

Figure 12:
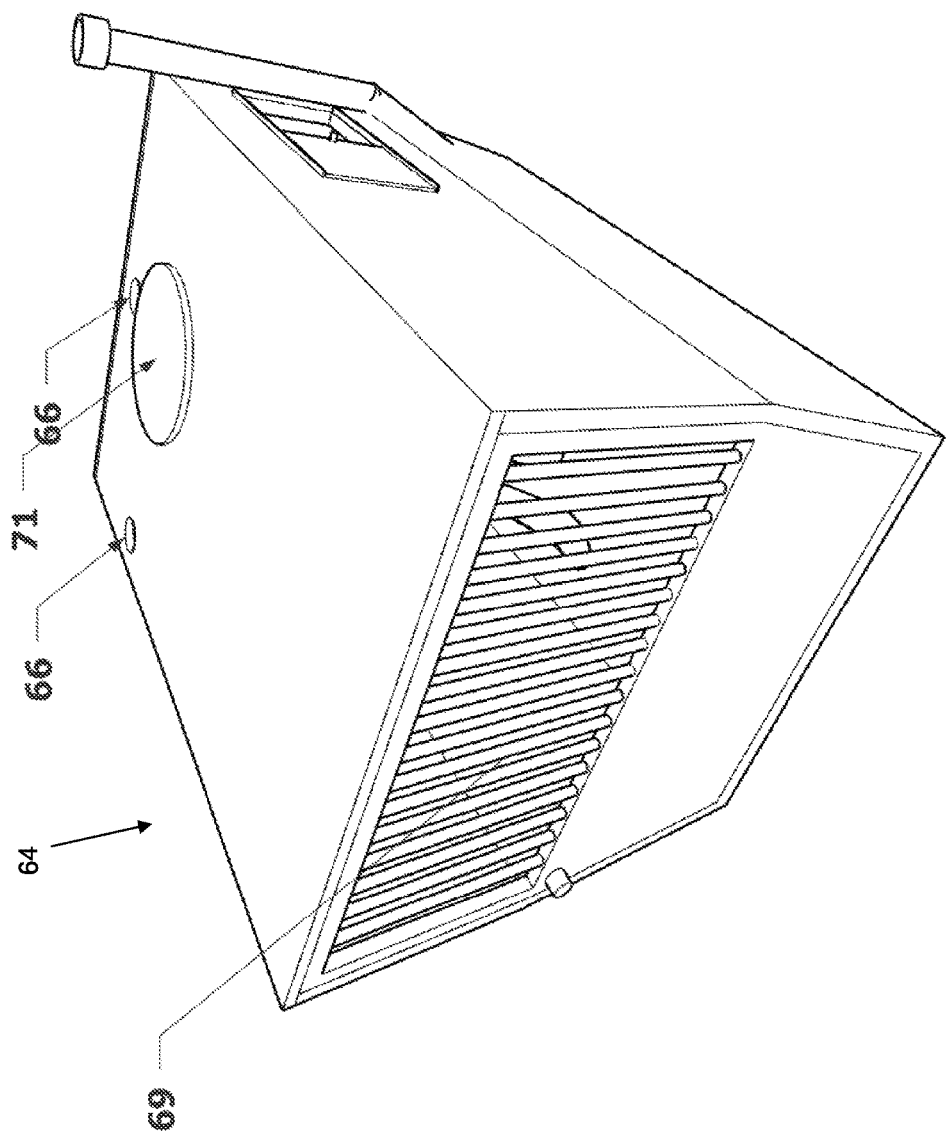

Upper section 62 may have openings which are occluded by a front wall member 67 and side wall members 68. One or more of the right side wall members 68 may be slidable to reveal the chamber 65 through which the handler may pet the subject dog or interact with him in other ways, such as visual or voice interaction. A video camera 66 may be fitted in an opening formed in top 67. The rear wall of upper section 62 may be provided with a grille 69 shown in FIG. 12, to enable proper circulation of the air within the compartment. One or more illumination elements 71 or sound emitting elements may be mounted within compartment 64, in order to provide a secondary encouragement. The illumination elements 71 preferably do not increase the temperature within compartment 64.

By virtue of the dog training apparatus and method described hereinabove, the subject dog learns to accurately and instinctively perform long duration odor detection operations in seclusion, without any physical or emotional contact with a handler. Despite being secluded, the subject dog receives encouragements and its performance can be monitored.

According to another embodiment, the field of view of the subject dog may be limited, or eliminated by darkening, so as to avoid distraction of the subject dog and increase his efficiency. This way, the subject dog relies more on sniffing.

Another way to avoid distraction is by limiting the displacement of the subject dog. This way, the subject dog sits or lies down and does not need to open his mouth to cool. Therefore, most of the time, breathing is made solely via his nose. This increases the detection efficiency, as well as the average total net operation period of the subject dog, since the relaxation period of the subject dog is used as well, for detection. Further increase may be obtained by cooling the compartment, to encourage the subject dog to breath via his nose.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for training a dog to perform odor detecting operations within a completely confined compartment that is dimensioned with a sufficiently large interior to completely enclose the dog there within while allowing it to freely sit, lie down and bark within said completely confined compartment, yet said completely confined compartment is sufficiently small to prevent the dog from running or roaming therewithin to conserve its energy, comprising the steps of:
 a) conditioning a subject dog to voluntarily enter a customized, rearwardly open partial compartment having at least three angularly different surfaces, including a front wall extending from a floor on which said subject dog is located to a height that is higher than said subject dog when in a standing position on its four legs, and first and second spaced lateral walls connected to said front wall, to define a single unconfined interior from which the subject dog, when unleashed, is able to independently leave, said surfaces being sufficiently long to provide the subject dog located within said interior with a sensation of being at least partially confined;
 b) following the conditioning step, leashing the subject dog to one of the at least three surfaces of the partial compartment, to thereby prevent the subject dog from leaving the partial compartment, while allowing its head to move freely and perform an odor detection operation;
 c) introducing into the interior of the partial compartment, via an air inlet, odor laden air originating from a first odor source;
 d) introducing into the interior of the partial compartment, via the air inlet, odor laden air originating from a second odor source emitting a predetermined target odor;

e) viewing the subject dog during the odor detection operation to determine whether the subject dog performs a trained action to indicate that an odor has been detected;

f) refraining from any reaction to the subject dog after it incorrectly performed the trained action following introduction of the odor laden air originating from the first odor source;

g) providing a dominant or secondary encouragement only after the subject dog performed the trained action following introduction of the odor laden air originating from the second odor source; and h) modularly attaching one or more wall segments to said first wall or to said second wall, so as to be coplanar therewith in order to increase a given dimension of said partial compartment until said given dimension is equal to a corresponding dimension of said completely confined compartment and to allow said subject dog to become accustomed to voluntarily remaining in or entering said completely confined compartment.

2. The method according to claim 1, wherein the dominant encouragement is provided to the subject dog via a food dischargeable member extending downwardly into the interior of the partial compartment to a basin for receiving the dominant encouragement discharged from said member without any visible human intervention.

3. The method according to claim 1, wherein the secondary encouragement is provided to the subject dog by one or more illumination elements or sound emitting elements as an indication that the subject dog performed up to expectations while detecting the target odor and that the dominant encouragement will be soon discharged.

4. The method according to claim 1, wherein the trained action is depressing a pushbutton movably connected to a wall of the partial compartment, receipt of the dominant encouragement constituting an incentive for accurately depressing the pushbutton.

5. The method according to claim 1, wherein a bottom portion of the partial compartment is closed and a top portion thereof is open.

6. The method according to claim 1, further comprising the step of activating a ventilator positioned proximate to the air inlet to cause odors to flow into the air inlet and be able to be detected by the subject dog.

7. The method according to claim 6, wherein the ventilator is a blower that is positioned within a hose that is attached to the front wall of the partial compartment so as to be in communication with the air inlet.

8. The method according to claim 7, further comprising the step of positioning a free end of the hose proximate to a device for sequentially displacing a plurality of odor emitting objects.

9. The method according to claim 1, further comprising the step of attaching an odor emittable package by a rod to the front wall of the partial compartment in order to prevent human contact with a material that emits the odor.

10. The method according to claim 1, wherein the step of viewing the subject dog is carried out by monitoring behavior of the subject dog with one or more video cameras when the subject dog ceases to have a line of sight with its handler.

11. The method according to claim 1, wherein the dominant encouragement is provided to the subject dog within a predetermined duration following provision of the secondary encouragement.

12. The method according to claim 1, further comprising the step of sequentially displacing to the vicinity of the air inlet a plurality of odor emitting objects, at least two of said objects emitting different odors, to thereby train the subject dog to discriminate between positive odors and negative odors and to wait patiently within the partial compartment until a positive odor is detected.

13. The method according to claim 1, wherein the subject dog is trained, prior to being capable of performing an odor detecting operation within the partial compartment, to be willing to remain in, or to enter, the confined compartment by being rewarded with the dominant or secondary encouragement only within the interior of the confined compartment and thereby associating pleasant memories with the confined compartment.

14. The method according to claim 1, wherein a handler trains the subject dog, before the subject dog is capable of performing an odor detecting operation within the partial compartment, to identify the target odor by introducing the target odor into an odor emittable package, and rewarding the subject dog with the dominant encouragement every time that it depresses a pushbutton in its close vicinity or held by the handler.

15. The method according to claim 14, wherein the subject dog is also trained, prior to being capable of performing an odor detecting operation within the partial compartment, to discriminate between positive and neutral odors and is then trained to discriminate between positive and negative odors.

16. The method according to claim 1, wherein the subject dog is trained to perform the action by:
   a) detecting the target odor;
   b) being granted the secondary encouragement;
   c) being forced by a handler to perform the action immediately after being granted the secondary encouragement;
   d) receiving the dominant encouragement; and
   e) eventually instinctively performing the action after detecting the target odor.

17. The method according to claim 16, wherein the trained action is selected from the group consisting of depressing a button, sitting, lying down, rolling over, and barking.

18. The method according to claim 1, further comprising limiting or darkening a field of view of the subject dog to avoid distraction.

19. The method according to claim 1, further comprising limiting displacement of the subject dog.

20. The method according to claim 1, further comprising cooling the partial compartment, to encourage the subject dog to breath via his nose.

21. The method according to claim 1, wherein an openwork segment is attached to the front wall of the partial compartment and the air inlet is formed in the front wall, the subject dog being trained to position its nose within the air inlet during the odor detecting operation even though an object associated with the second odor source is not visible through said openwork segment.

22. A method for training a subject dog to perform odor detecting operations within a completely confined compartment, comprising the steps of:
   a) leashing a subject dog to one of at least three surfaces of a partial compartment defining an interior, said surfaces being sufficiently long to provide said subject dog, when located within the interior, with a sensation of being at least partially confined;
   b) introducing into the interior of the partial compartment, via an air inlet defined by a configuration of said partial compartment, odor laden air originating from a first odor source;

c) introducing into the interior of the partial compartment, via the air inlet, odor laden air originating from a second odor source emitting a predetermined target odor;

d) viewing the subject dog during an odor detection operation to determine whether the subject dog performs a trained action to indicate that an odor has been detected;

e) refraining from any reaction to the subject dog after it incorrectly performed the trained action following introduction of the odor laden air originating from the first odor source;

f) providing the subject dog with a secondary encouragement as an indication that it performed up to expectations while detecting the target odor and that a dominant encouragement will be soon discharged; and g) discharging the dominant encouragement into the interior of the partial compartment without any visible human intervention, wherein the dominant or secondary encouragement is provided only after the subject dog performed the trained action following introduction of the odor laden air originating from the second odor source, wherein the dominant encouragement is provided to the subject dog within a predetermined duration following provision of the secondary encouragement, wherein the predetermined duration is increased when the subject dog is at a more advanced stage of training.

23. The method according to claim 22, wherein the at least three surfaces of the partial compartment are dimensioned such that the subject dog will be able to freely sit, lie down and bark within the completely confined compartment after being fully assembled.

24. The method according to claim 22, wherein the predetermined duration is selected from the group consisting of 5 seconds, 1 minute, and 10 minutes.

25. The method according to claim 22, wherein the partial compartment is modular and one or more wall segments are attached thereto in order to increase the size of the interior of the partial compartment and to allow the subject dog to become accustomed to voluntarily remaining in or entering the completely confined compartment after the subject dog has been unleashed.

26. The method according to claim 25, wherein an openwork segment is attached to, and above, a front surface of an original partial compartment and the air inlet is formed in said front surface, the subject dog being trained to position its nose within the air inlet during an odor detecting operation even though an object associated with the second odor source is visible through said openwork segment.

* * * * *